(12) United States Patent
Sing (10) Patent No.: US 12,459,380 B1
(45) Date of Patent: Nov. 4, 2025

(54) CHARGING INTERFACE FOR ROBOT

(71) Applicant: Amazon Technologies, Inc., Seattle, WA (US)

(72) Inventor: Samrin Sing, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 594 days.

(21) Appl. No.: 17/935,005

(22) Filed: Sep. 23, 2022

(51) Int. Cl.
*B60L 53/16* (2019.01)
*B60L 53/30* (2019.01)
*H01R 13/15* (2006.01)
*H02J 7/00* (2006.01)

(52) U.S. Cl.
CPC .......... *B60L 53/16* (2019.02); *B60L 53/305* (2019.02); *H01R 13/15* (2013.01); *H02J 7/0042* (2013.01)

(58) Field of Classification Search
CPC .......... B60L 53/14; B60L 53/16; H02J 7/0042
USPC ................ 320/107, 105, 113, 115
See application file for complete search history.

(56) References Cited

U.S. PATENT DOCUMENTS

| | | | | |
|---|---|---|---|---|
| 4,588,938 A * | 5/1986 | Liautaud | ............... | H02J 7/0045 439/700 |
| 8,324,858 B2 * | 12/2012 | Hill | ........................ | B60L 5/005 180/312 |
| 9,010,348 B1 | 4/2015 | Kite | | |
| 9,559,461 B1 | 1/2017 | Diehr | | |
| 10,399,443 B2 | 9/2019 | Kwa et al. | | |
| 10,644,519 B2 | 5/2020 | Brady et al. | | |
| 11,135,930 B2 | 10/2021 | Traverso et al. | | |
| 11,171,448 B2 * | 11/2021 | Hirose | ................. | G06F 1/1632 |
| 11,552,488 B2 | 1/2023 | Daily et al. | | |
| 11,623,539 B1 | 4/2023 | Brady | | |
| 2004/0158357 A1 * | 8/2004 | Lee | ....................... | G05D 1/028 700/258 |
| 2017/0282734 A1 | 10/2017 | Noorani et al. | | |
| 2018/0208126 A1 | 7/2018 | Arvidsson et al. | | |
| 2019/0059680 A1 * | 2/2019 | Fox | ..................... | A47L 11/4011 |
| 2019/0202064 A1 * | 7/2019 | Wolff | .................... | G05D 1/0225 |

(Continued)

FOREIGN PATENT DOCUMENTS

| | | |
|---|---|---|
| CN | 106985695 A | 7/2017 |
| CN | 210156947 U | 3/2020 |

(Continued)

OTHER PUBLICATIONS

U.S. Appl. No. 17/215,777, filed Mar. 29, 2021 titled Charging Deice for Autonomous Ground Vehicle.

*Primary Examiner* — Jared Fureman
(74) *Attorney, Agent, or Firm* — Knobbe, Martens, Olson & Bear, LLP (57) ABSTRACT

A charging interface for a robot includes a housing comprising a plurality of recesses, one or more charge contact members, and one or more data contact members. The charge contact members can be at least partially disposed within on or more of the plurality of recesses. Each charge contact member can include an electrical charge pin extending through an opening of a surface of the charge contact member. The data contact members can be at least partially disposed within one or more of the plurality of recesses. Each data contact member can include an electrical data pin extending through an opening of a surface of the data contact member. The charge contact member and the data contact members can be moveably coupled to the housing.

20 Claims, 9 Drawing Sheets

(56) References Cited

U.S. PATENT DOCUMENTS

| | | |
|---|---|---|
| 2019/0346852 A1 | 11/2019 | Itozawa |
| 2019/0380552 A1 | 12/2019 | Han et al. |
| 2020/0249688 A1 | 8/2020 | Caussy et al. |
| 2020/0269712 A1 | 8/2020 | Kozlovsky et al. |
| 2020/0375093 A1* | 12/2020 | Matus .................. B60W 30/10 |
| 2021/0083494 A1 | 3/2021 | Towner et al. |
| 2021/0228039 A1* | 7/2021 | Brouwers ............ G05D 1/0242 |
| 2022/0194245 A1 | 6/2022 | Gonano et al. |
| 2022/0219557 A1* | 7/2022 | Poluboiarinov ....... B25J 19/005 |

FOREIGN PATENT DOCUMENTS

| | | | |
|---|---|---|---|
| CN | 111231723 A | | 6/2020 |
| CN | 115101994 A | * | 9/2022 |

* cited by examiner

CHARGING INTERFACE FOR ROBOT

BACKGROUND

Robots are used in various environments, such as warehouses and fulfillment centers. The robots need to engage charging interfaces to recharge. Typical charging interfaces have the electrical interface component and the mechanical interface component be the same interface component (e.g., cantilevered leaf springs). In such charging interfaces, the interface component(s) that provides the mechanical and electrical connection either need to be able to withstand the wear and tear of use or need to be replaced frequently due to damage caused when robots engage the charging interface.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 10 illustrates a fixation member having a receiving area that the charging interface of FIG. 1 can be positioned in;

DETAILED DESCRIPTION

The present disclosure generally relates to charging interfaces for use with a robot. The robot can engage the charging interface by driving over a charging interface positioned in a lower horizontal orientation so that a bottom portion of the robot interfaces with the charging interface. Alternatively, the robot can engage the charging interface by driving under a charging interface positioned in an upper horizontal orientation so that a top portion of the robot interfaces with the charging interface. In still another implementation, the robot can engage the charging interface by driving up to a charging interface in a vertical orientation (e.g., so that a side surface of the robot engages the charging interface). When the robot engages the charging interface there can be a minor collision between the robot and the charging interface. Therefore, it is desirable to have charging interfaces where the electrical and mechanical interface components are decoupled from each other to avoid wear and tear to the mechanical interface components from such collisions resulting in damage to the electrical interface components. The present disclosure generally relates to charging interfaces where the mechanical components (e.g., charge contact members and data contact members) are decoupled from the electrical components (e.g., electrical contact pins), advantageously inhibiting (e.g., preventing) damage to the electrical interface components due to collision between the robot and charging interface.

Figure 1:
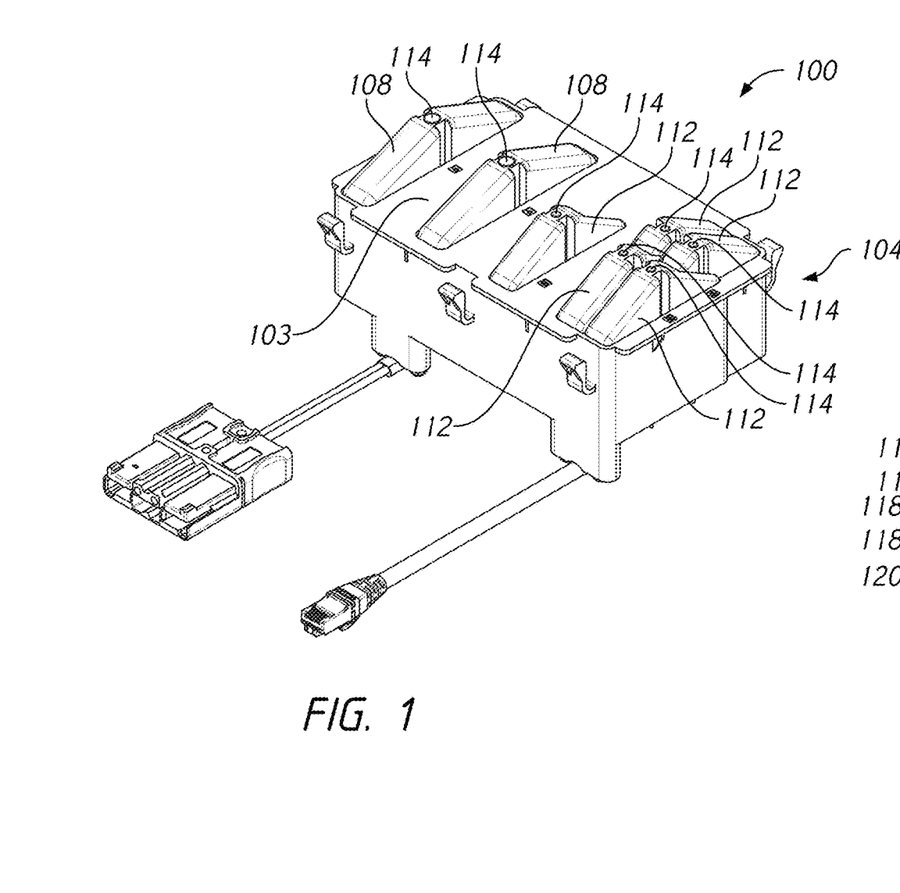
FIG. 1 is a perspective top view of a charging interface for a robot.
Figure 11A:
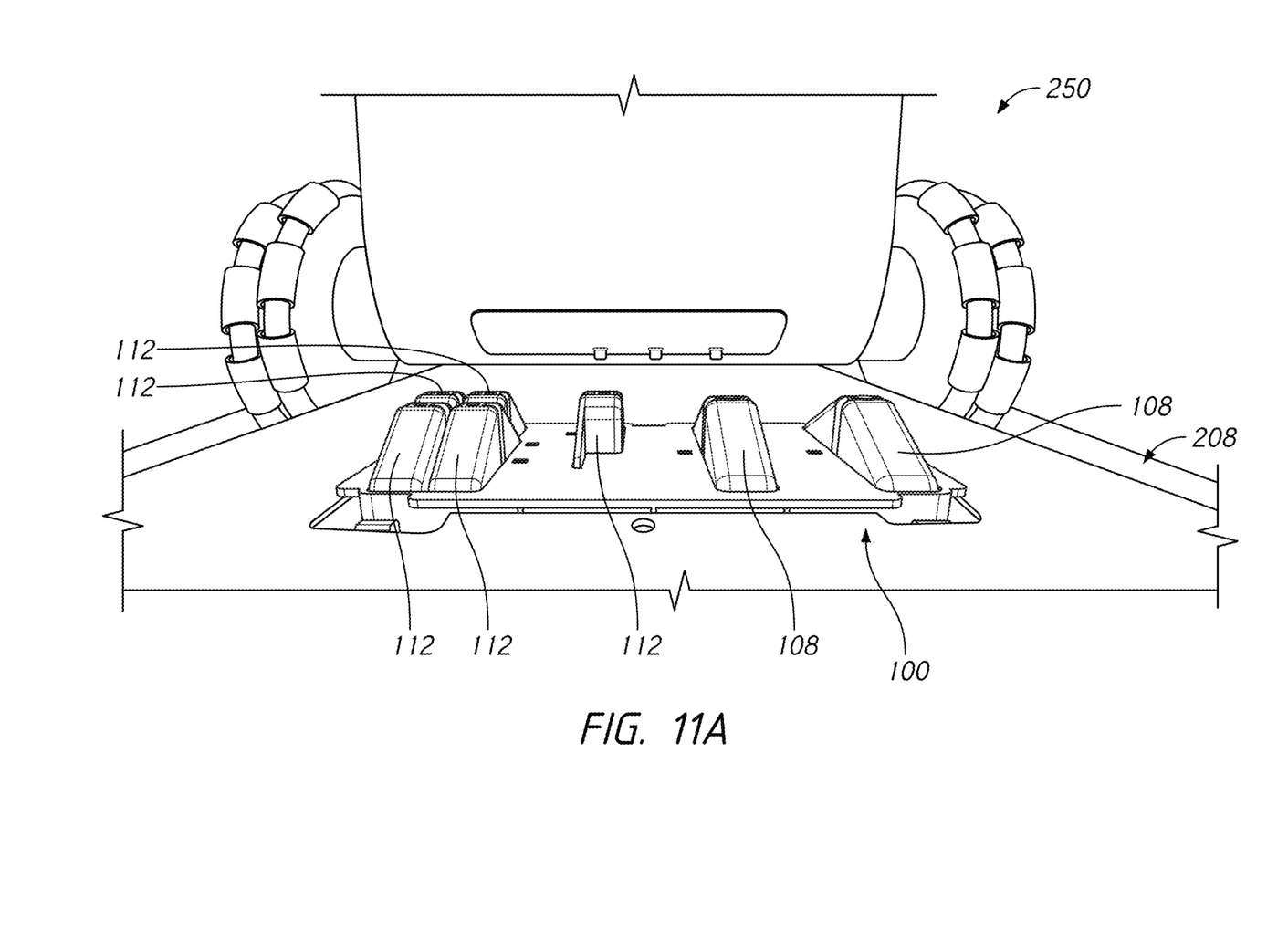
FIG. 11A illustrates a robot prior to engaging the charging interface of FIG. 1.
Figure 11B:
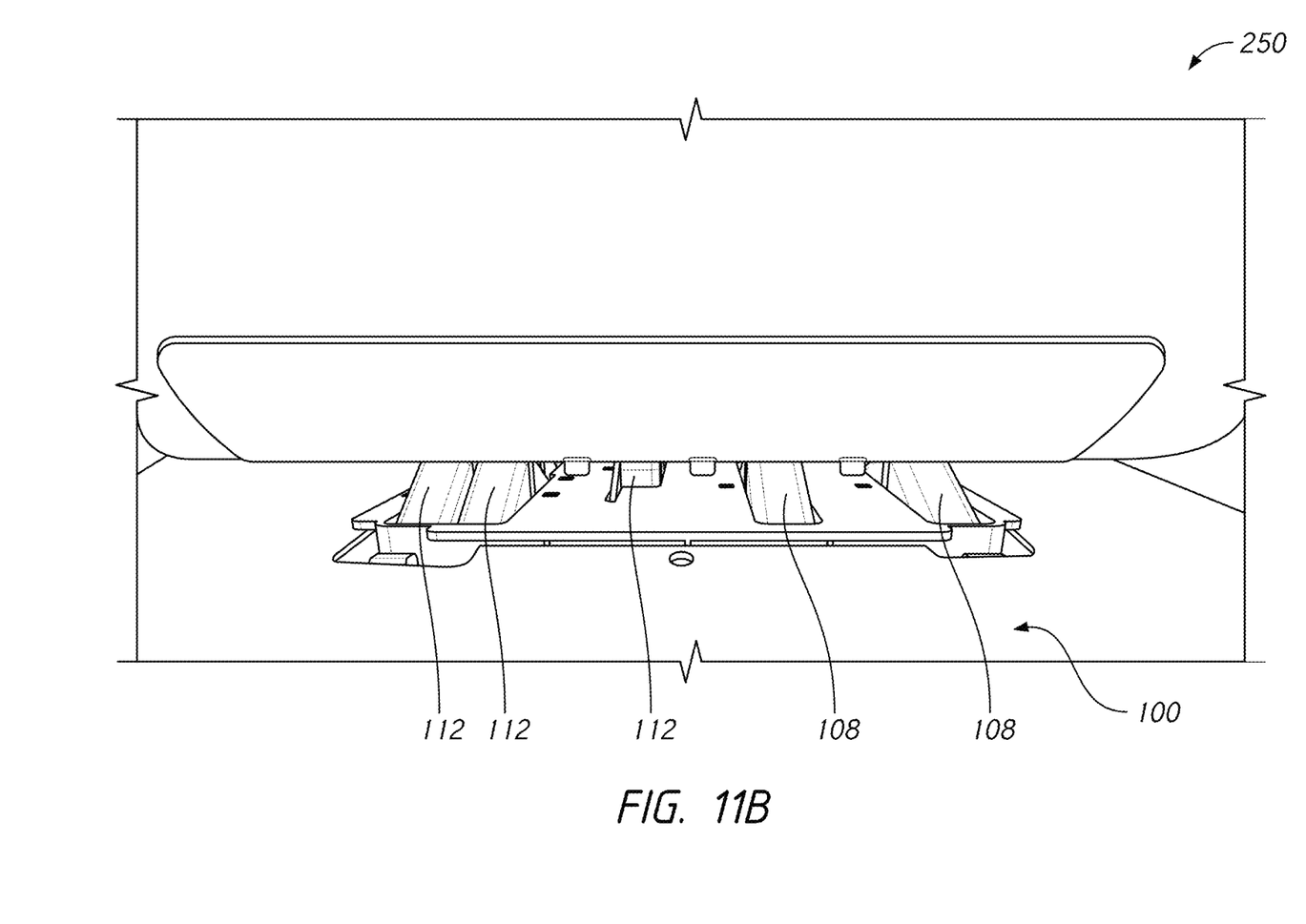
FIG. 11B illustrates a robot engaged with the charging interface of FIG. 1.

FIG. 1 is a perspective view of a charging interface 100. The charging interface 100 can be engaged by a robot to provide power to the robot. In some embodiments, the charging interface 100 can be positioned in a horizontal orientation, for example positioned in or on a floor, wherein the robot can drive over the charging interface 100 to engage the charging interface 100 or positioned in a ceiling where the robot can drive under the charging interface 100 to engage the charging interface 100. For example, a charging interface 100 positioned in a floor is shown in FIGS. 11A and 11B. In some embodiments, the charging interface 100 can be positioned in a vertical orientation, for example positioned in a wall, wherein a side (e.g., front side, rear side, left side, right side) of the robot can engage the charging interface 100 by driving up to the wall or other vertical surface.

The charging interface 100 can include a housing 104, one or more charge contact members 108, and one or more data contact members 112. Electrical contact pins 114 can extend through each charge contact member 108 and each data contact member 112. The charge contact members 108 can supply the power to the robot. The data contact members 112 can transfer data to the robot and/or transfer data from the robot. Non-limiting examples of data that can be transferred from the robot include mapping data, camera images, sensor data, temperature data, travel recorder data (e.g., torque, speed, variations in temperature, sensor alerts), battery health data, historical charging data, and state of charge. The charge contact members 108 and the data contact members 112 can be at least partially disposed in and movably coupled to the housing. Portions of the charge contact members 108 and the data contact members 112 can extend above a surface 103 of the housing 104 such that the charge contact members 108 and the data contact members 112 can be engaged by a robot. When robot engages the charging interface 100, one or more charge contact member 108 and/or one or more data contact member 112 can be engaged and pushed relative to (e.g., pushed into) the housing 104 as described herein.

Figure 2:
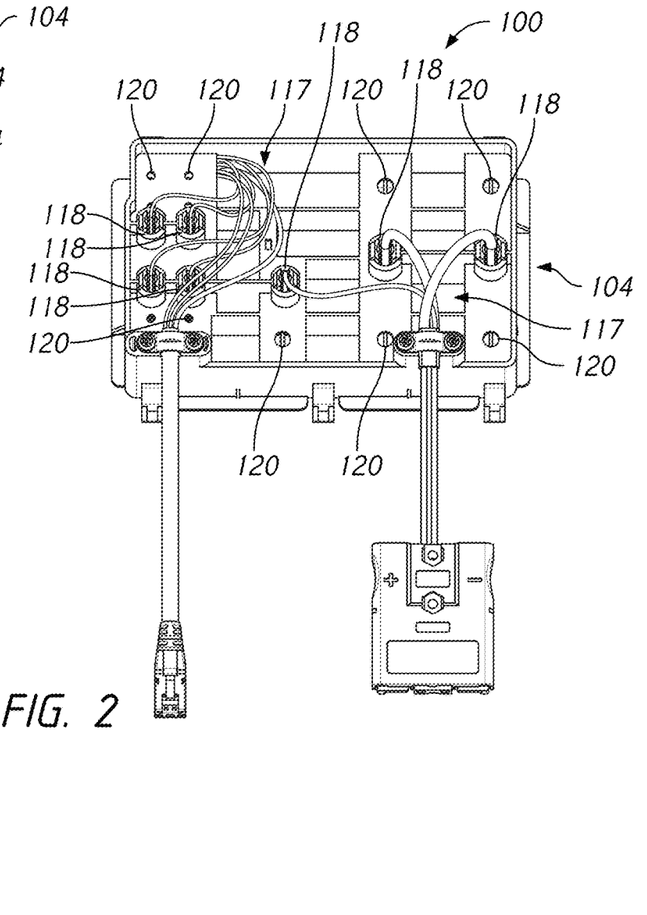
FIG. 2 is a perspective bottom view of the charging interface of FIG. 1.

FIG. 2 is a bottom view of the charging interface 100. The charging interface 100 can include a plurality of openings 118 sized to receive a portion of either a charge contact member 108 or a data contact member 112, as further described herein. As shown, the wiring 117 of the electrical contact pins 114 can extend through each charge contact member 108 or each data contact member 112 and out the openings 118. The wiring 117 can have a length long enough to accommodate the movement of the charge contact members 108 and the data contact members 112 relative to the housing 104. The electrical contact pins 114 are advantageously decoupled from the charge contact members 108 and the data contact members 112. For example, an operation of the electrical contact pins 114 is decoupled from a movement of the charge contact members 108 and/or the data contact members 112. This decoupling can eliminate the electrical contact pins 114 from needing to withstand the collisions that occur when a robot engages the charging interface 100. The collision force from the robot engaging the charging interface 100 can be absorbed by the charge contact members 108 and/or data contact members 112 by the robot at least partially depressing the members 108, 112 relative to the housing 104.

The charging interface 100 can also include a plurality of drainage openings 120. The plurality of drainage openings 120 can extend through one or more recesses 116 that receive the charge contact member 108 and/or the data contact members 112. The plurality of drainage openings 120 can allow water, fluid, debris, etc. to exit the housing 104. This can inhibit (e.g., prevent, reduce) pooling water from gathering in the charging interface 100. The height of the charge contact members 108 and/or the height of the data contact members 112 can be a predetermined minimum height in order to reduce the chance that pooling water will cause bridging across the electrical contact pins 114. For example, the height can be a distance that allows for portions of the charge contact members 108 and data contact members 112 to extend above the housing such that the electrical contact pins 114 are at height that inhibits or prevents any pooling water from reaching the exposed portion of the electrical contact pins 114.

Figure 3:
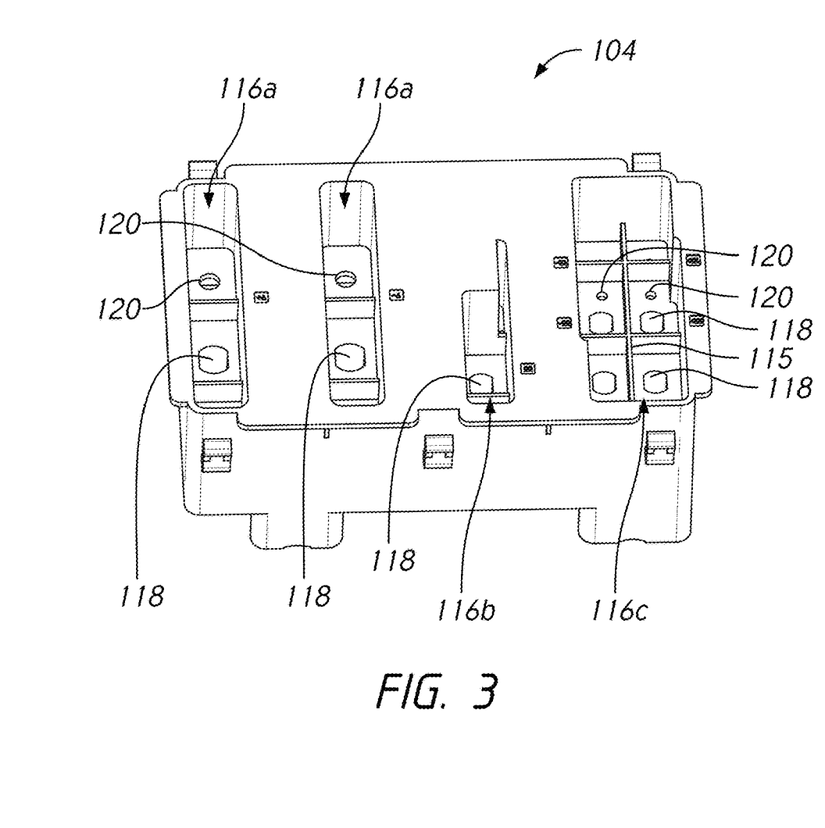
FIG. 3 is a top perspective view of a housing of the charging interface of FIG. 1.
Figure 4:
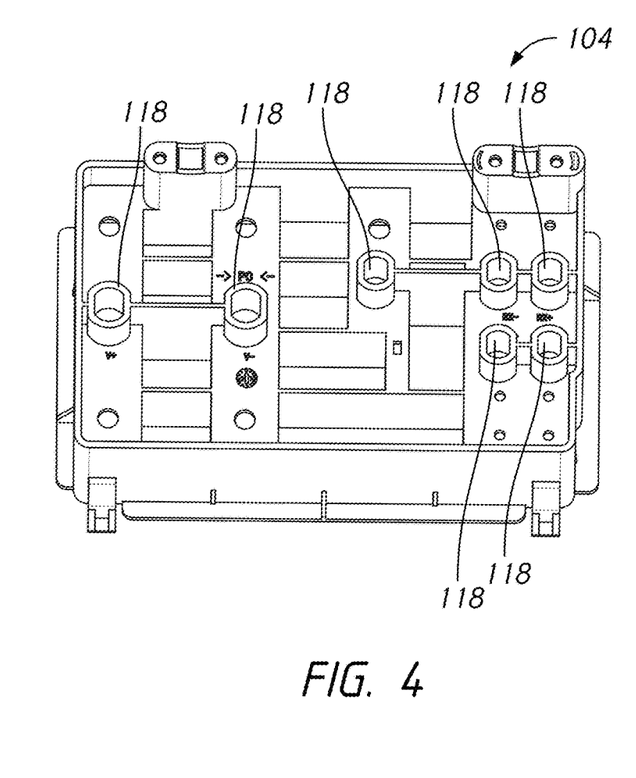
FIG. 4 is a bottom perspective view of the housing of FIG. 3.

FIG. 3 is a top view of the housing 104 with the charge contact members 108 and the data contact members 112 removed for illustrative purposes. As shown, the housing 104 can include one or more recesses 116. The recesses 116 can be sized and shaped to receive one or more of the charge contact members 108 and the data contact members 112. For example, recesses 116a are sized to each receive a single charge contact member 108, while recess 116b is sized to reach a single data contact member 112 and recess 116c is sized to receive four data contact members 112. The housing 104 can have recesses 116 sized to incorporate any combination of charge contact members 108 and data contact members 112. In some embodiments, recesses 116 (e.g., recess 116c) that are sized to receive more than charge contact member 108 and/or data contact member 112 can include dividers or walls 115 positioned to create sub-recesses for each charge contact member 108 or data contact member 112 within the recess 116. The openings 118 described herein can extend through the recesses 116. For example, FIG. 4 shows a bottom view of the openings 118 extending through the recesses 116.

Figure 5A:
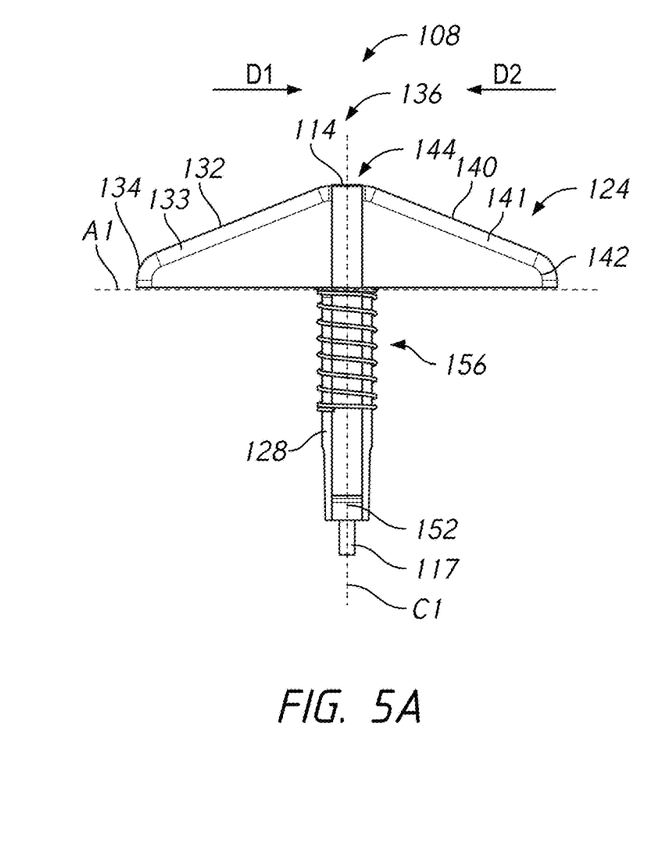
FIG. 5A is a side view of a charge contact member that can be moveably coupled with the housing of FIG. 3.
Figure 5B:
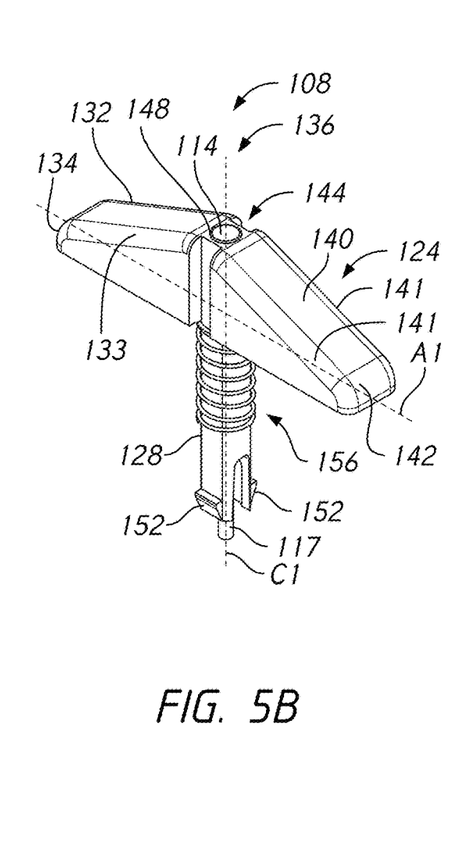
FIG. 5B is a perspective view of the charge contact member of FIG. 5A.
Figure 5C:
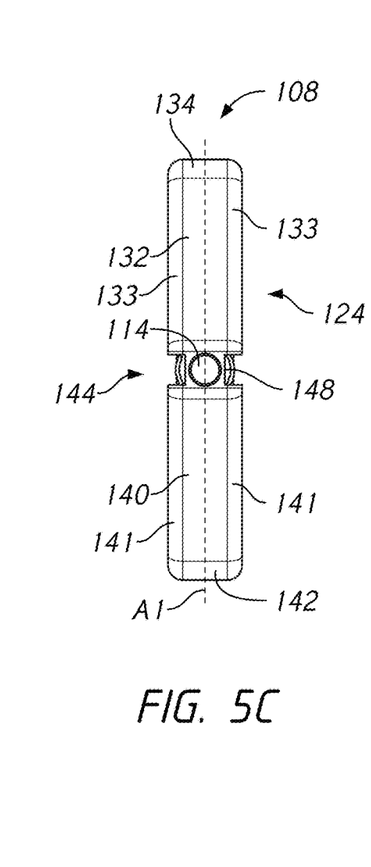
FIG. 5C is a top view of the charge contact member of FIG. 5A.

FIGS. 5A-5C illustrate a charge contact member 108 removed from the charging interface 100 for illustrative purposes. While the description of FIGS. 5A-5C is with reference to a single charge contact member 108, any charge contact member 108 of the charging interface 100 can include any combination of the features of the present disclosure. Additionally, in some embodiments the charge contact members 108 and the data contact members 112 can be identical (e.g., in shape, height, etc.). As such, the data contact members 112 can include any combination of features described with reference to the charge contact member 108 according to the present disclosure, and vice versa. All charge contact members 108 of a single charging interface 100 do not need to be identical, as such each charge contact member 108 can have differing features as apparent by the present disclosure. The charge contact member 108 can be movably coupled to the housing 104. The charge contact member 108 can be positioned within the corresponding recess 116 such that when a robot engages the charge contact member 108 it can be at least partially depressed into the recess 116.

The charge contact member 108 can include a contact portion 124 and a shaft 128 extending from a bottom surface of the contact portion 124. The contact portion 124 can include a first angled surface 132 extending (e.g., linearly) toward an upper end 136 of the charge contact member 108. The first angled surface 132 can have chamfered edges 133 along opposing sides of the first angled surface 132 that extend toward the upper end 136. The first angled surface 132 can have a chamfered end surface 134. The first angled surface 132 can be angled relative to the horizontal axis A1. In some embodiments, the charge contact portion 124 can include a second angled surface 140 extending (e.g., linearly) from the upper end 136 of the charge contact member 108. The second angled surface 140 can have chamfered edges 141 along opposing sides of the first angled surface 140 that extend away from the upper end 136. The second angled surface 140 can have a chamfered end surface 142. The second angled surface 140 can be angled relative to the horizontal axis A1. The first angled surface 132 and the second angled surface 140 can have equal widths and lengths and be mirror images of each other. Stated another way the first angled surface 132 and the second angled surface 140 can be identical but extending in opposite directions from the upper end 136. The first angled surface 132 and/or the second angled surface 140 can allow for an easier engagement between a robot and the charging interface 100 as the robot can gradually engage the charge contact member(s) 108 from a first direction D1 or an opposite second direction D2. The degree of the angled surfaces 132, 140 can be dependent upon space requirements. For example, the charge contact member 108 may have a predetermined height that allows for it to extend above the surface 103 of the housing 104 and the degree of the angled surfaces 132, 140 can be selected to account for that height. In some instances, the overall height may need to be taller or shorter depending on the environment and/or robot and the final overall height can affect the degree of the angled surfaces 132, 140.

The contact portion 124 can include a contact surface 144. The contact surface 144 can be positioned at the upper end 136 (e.g., apex) of the charge contact member 108. In some embodiments, the contact surface 144 can be positioned between the first angled surface 132 and the second angled surface 140. The contact surface 144 can include a through hole 148 that extends through the contact portion 124 and the shaft 128 of the charge contact member 108. The through hole 148 can be sized to receive the electrical contact pin 114. The electrical contact pins 114 can be press-fit into the through holes 148. The electrical contact pin 114 can extend from the contact surface 144 through the shaft 128. The through hole 148 can be sized such that it substantially conforms to the entire contact surface 144 thus limiting the overall surface area of the contact surface 144.

The shaft 128 of the charge contact member 108 can extend generally perpendicular to the contact portion 124. The shaft 128 can extend along a central axis C1 that extends through the charge contact member 108. In some embodiments, the shaft 128 can be non-circular. The non-circular shape can correspond to the opening 118 of the housing 104 to inhibit or reduce rotation of the charge contact member 108 within the housing 104. The non-circular shape can also assist in aligning the charge contact member 108 within the housing 104. For example, the shaft 128 can be square, rectangular, or oval. The shaft 128 can include one or more prongs 152 extending outward from the shaft 128. In some embodiments, the shaft 128 can have two prongs 152 disposed opposite each other on the shaft 128. The prongs 152 can be positioned at or near an end of the shaft 128 such that when the charge contact member 108 is positioned within a recess 116 the shaft 128 extends into the opening 118 (as shown in FIGS. 3 and 4) and the prongs 152 extend outward of the opening 118, thus retaining the charge contact member 108 within the recess 116. This is shown and described further with reference to FIG. 8.

A spring or biasing member 156 can be disposed on the shaft 128 (e.g., about at least a portion of the shaft 128). As such, the charge contact member 108 can be spring loaded relative to the housing 104 and capable of movement relative to the housing 104 between a disengaged state where the charge contact member 108 protrudes above the housing 104 and is not in contact, for example, with a robot, and an engaged state where the charge contact member 108 is at least partially depressed toward the housing 104 within its respective recess 116 due to contact, for example, with a robot. The charge contact member 108 can be biased toward the disengaged state by the spring or biasing member 156. In some embodiments, the prongs 152 can assist in retaining the biasing member 156 on the shaft 128 by preventing the biasing member 156 from sliding off the shaft 128. In some embodiments, the wiring 117 from the electrical contact pins 114 can extend from the first end of the through hole 148 at the apex of the charge contact member 108 through the shaft 128. The wiring 117 within the shaft 128 and between the prongs 152 can inhibit or prevent the prongs 152 from flexing as the space in between can be occupied by the wiring 117, thereby inhibiting (e.g., preventing) decoupling of the prongs 152 (and thereby the charge contact member 108) from the housing 104. While springs are depicted as the biasing member 156, other mechanisms for moveably coupling the charge contact member 108 and housing 104 can be used. For example, resilient arms, pneumatic pistons, hydraulic pistons, elastomers and/or diaphragms can be used to: moveably couple the charge contact member 108 to the housing 104 and/or bias charge contact member 108. Each charge contact member 108 is independent of the others. As such, the biasing member 156 can be specifically chosen for the application the charge contact member 108 is intended to perform. Therefore, in some embodiments, the biasing member 156 of each charge contact member 108 may be the same or different.

Figure 6A:
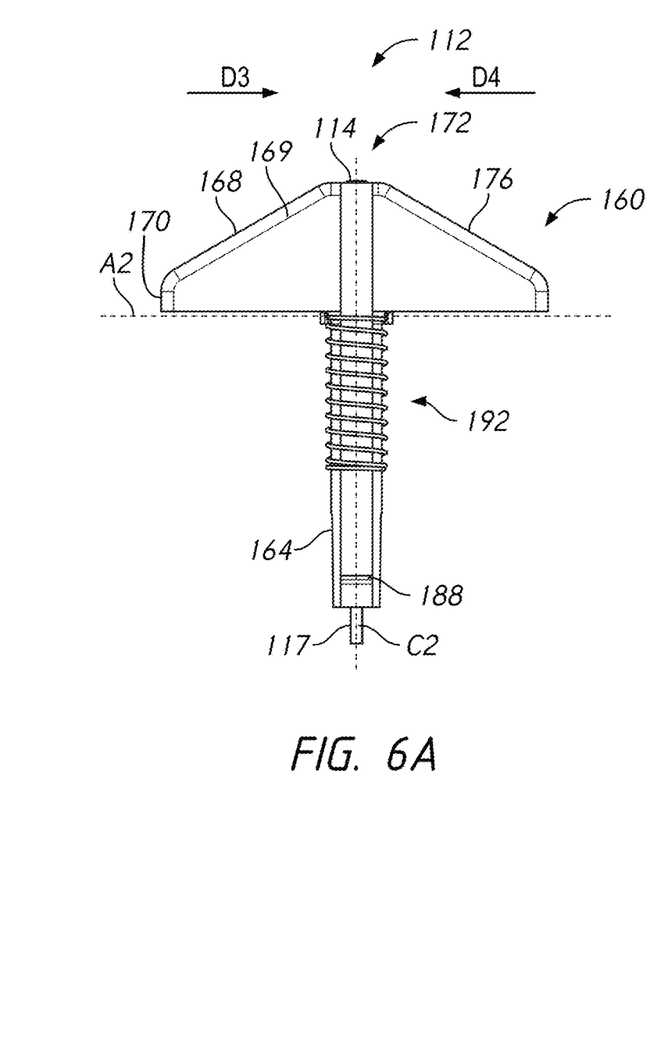
FIG. 6A is a side view of a data contact member that can be moveably coupled with the housing of FIG. 3.
Figure 6B:
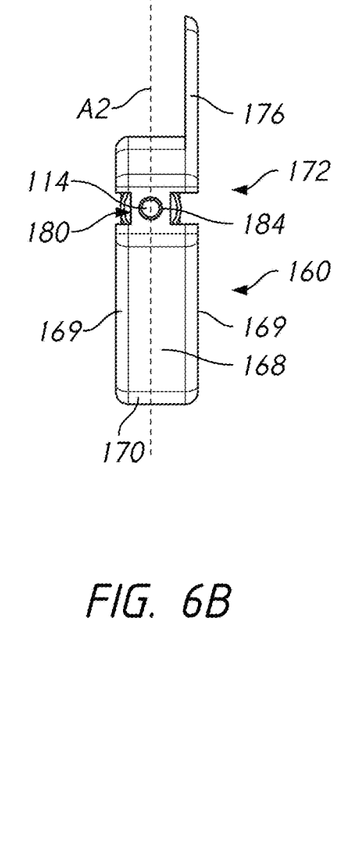
FIG. 6B is a top view of the data contact member of FIG. 6A.
Figure 6C:
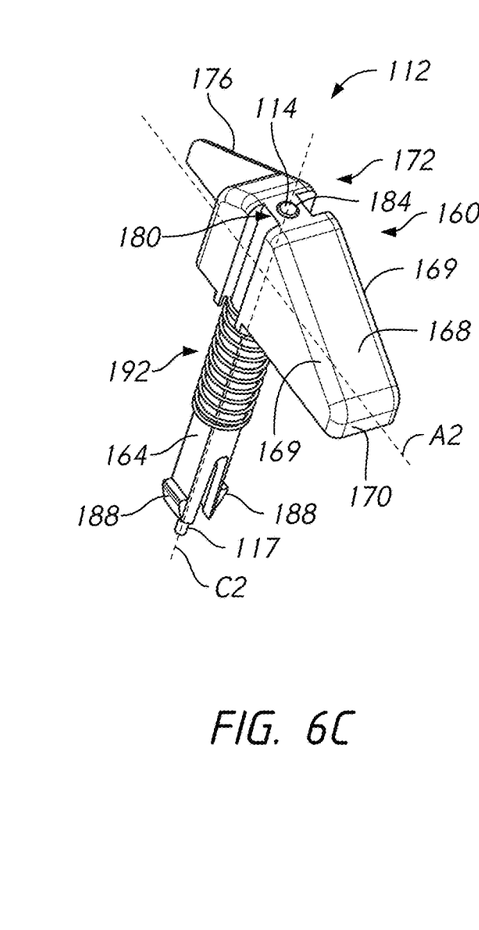
FIG. 6C is a perspective view of the data contact member of FIG. 6A.

FIGS. 6A-6C illustrate a data contact member 112 removed from the charging interface 100 for illustrative purposes. While the description of FIGS. 6A-6C is with reference to a single data contact member 112, any data contact member 112 of the charging interface 100 can include any combination of the features of the present disclosure. Additionally, in some embodiments the charge contact members 108 and the data contact members 112 can be identical (e.g., in shape, height, etc.). As such, the charge contact members 108 can include any combination of features described with reference to the data contact member 112 according to the present disclosure, and vice versa. All data contact members 112 of a single charging interface 100 do not need to be identical, as such each data contact member 112 can have differing features as apparent by the present disclosure. The data contact member 112 can be movably coupled to the housing 104. The data contact member 112 can be positioned within the corresponding recess 116 such that when a robot engages the data contact member 112 it can be at least partially depressed into the recess 116.

The data contact member 112 can include a contact portion 160 and a shaft 164 extending from a bottom surface of the contact portion 160. The contact portion 160 can include a first angled surface 168 extending (e.g., linearly) toward an upper end 172 of the data contact member 112. The first angled surface 168 can have chamfered edges 169 along opposing sides of the first angled surface 168 that extend toward the upper end 172. The first angled surface 168 can have a chamfered end surface 170. The first angled surface 168 can be angled relative to the horizontal axis A2. In some embodiments, the contact portion 160 can include an angled edge 176 extending (e.g., linearly) from the upper end 172 of the data contact member 112. The angled edge 176 can have a width and length substantially equal to a width and length of one of the chamfered edges 169 of the first angled surface 168. The angled edge 176 can be positioned opposite one of the chamfered edges 169 extending from the opposite side of the upper end 172. The angled edge 176 can be angled relative to the horizontal axis A2. The first angled surface 168 and/or the angled edge 176 can allow for an easier engagement between a robot and the charging interface 100 as the robot can gradually engage the data contact member(s) 112 from a first direction D3 or an opposite second direction D4. The degree of the angled surface 168 and/or the angled edge 176 can be dependent upon space requirements. For example, the data contact member 112 may have a predetermined height that allows for it to extend above the surface 103 of the housing 104 and the degree of the angled surface 168 and/or the angled edge 176 can be selected to account for that height. In some instances, the overall height may need to be taller or shorter depending on the environment and/or robot and the final overall height can affect the degree of the angled surface 168 and/or angled edge 176.

The contact portion 160 can include a contact surface 180. The contact surface 180 can be positioned at the upper end 172 (e.g., apex) of the data contact member 112. In some embodiments, the contact surface 180 can be positioned between the first angled surface 168 and the angled edge 176. The contact surface 180 can include a through hole 184 that extends through the contact portion 160 and the shaft 164 of the data contact member 112. The through hole 184 can be sized to receive the electrical contact pin 114. The electrical contact pins 114 can be press-fit into the through holes 184. The electrical contact pin 114 can extend from the contact surface 180 through the shaft 164. The through hole 184 can be sized such that it substantially conforms to the entire contact surface 180 thus limiting the overall surface area of the contact surface 180.

The shaft 164 of the data contact member 112 can extend generally perpendicular to the contact portion 160. The shaft 164 can extend along a central axis C2 that extends through the data contact member 112. In some embodiments, the shaft 164 can be non-circular. The non-circular shape can correspond to the opening 118 of the housing 104 to inhibit or reduce rotation of the data contact member 112 within the housing 104. The non-circular shape can also assist in aligning the data contact member 112 within the housing 104. For example, the shaft 128 can be square, rectangular, or oval. The shaft 164 can include one or more prongs 188 extending outward from the shaft 164. In some embodiments, the shaft 164 can have two prongs 188 disposed opposite each other on the shaft 164. The prongs 188 can be positioned at or near an end of the shaft 164 such that when the data contact member 112 is positioned within a recess 116 the shaft 164 extends into the opening 118 (as shown in FIGS. 3 and 4) and the prongs 188 extend outward of the opening 118, thus retaining the data contact member 112 within the recess 116. This is shown and described further with reference to FIG. 8.

A spring or biasing member 192 can be disposed on the shaft 164 (e.g., about at least a portion of the shaft 164). As such, the data contact member 112 can be spring loaded relative to the housing 104 and capable of movement relative to the housing 104 between a disengaged state where the data contact member 112 protrudes above the housing 104 and is not in contact, for example, with a robot, and an engaged state where the data contact member 112 is at least partially depressed toward the housing 104 within its respective recess 116 due to contact, for example, with a robot. The data contact member 112 can be biased toward the disengaged state by the spring or biasing member 192. In some embodiments, the prongs 188 can assist in retaining the biasing member 192 on the shaft 164 by preventing the biasing member 192 from sliding off the shaft 164. In some embodiments, the wiring 117 from the electrical contact pins 114 can extend from the first end of the through hole 184 at the apex of the data contact member 112 through the shaft 164. The wiring 117 within the shaft 164 and between the prongs 188 can inhibit or prevent the prongs 188 from flexing as the space in between can be occupied by the wiring 117, thereby inhibiting (e.g., preventing) decoupling of the prongs 188 (and thereby the data contact member 112) from the housing 104. While springs are depicted as the biasing member 192, other mechanisms for moveably coupling the data contact member 112 and housing 104 can be used. For example, resilient arms, pneumatic pistons, hydraulic pistons, elastomers and/or diaphragms can be used to moveably couple the data contact member 112 to the housing 104. Each data contact member 112 is independent of the others. As such, the biasing member 192 can be specifically chosen for the application the data contact member 112 is intended to perform. Therefore, in some embodiments, the biasing member 192 of each data contact member 112 may be the same or different. The spring force can vary among data contact members 112. For example, in some embodiments the data contact members 112 can have a lower spring force than the charge contact members 108. This can reduce the amount of force needed to depress the data contact members to decrease the wear and tear on the data contact members 112.

Figure 7:
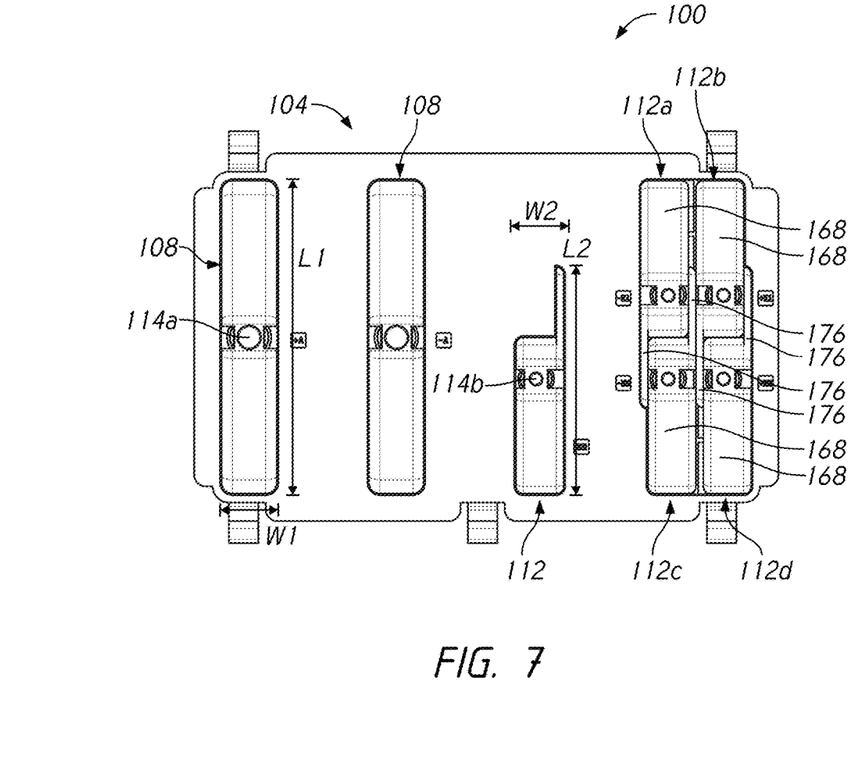
FIG. 7 is a top view of the charging interface of FIG. 1 having charge contact members and data contact members coupled to the housing of the charging interface.

FIG. 7 is a top view of the charging interface 100. The charging interface 100 can have at least one charge contact member 108 and at least one data contact member 112. In some implementations, the charge contact member(s) 108 can be larger than the data contact member(s) 112. The charge contact member 108 can have a length L1 that exceeds a length L2 of the data contact member 112. The charge contact member 108 can have a width W1 that is equal to or greater than the width W2 of the data contact member 112. In some embodiments, the charge contact members 108 and the data contact members 112 can be identical (e.g., have the same length and width).

The electrical contact pins 114a of the charge contact members 108 can be the same or different than the electrical contact pins 114b of the data contact members 112. In some embodiments, the electrical contact pins 114a of the charge contact members 108 can be larger in size than the electrical contact pins 114b of the data contact members 112. This can result in the charge contact members 108 being larger in size than the data contact members 112. The charge contact members 108 can accommodate the electrical requirements of charging (e.g., high current) and the data contact members 112 can accommodate data transfer (e.g., low current and impedance).

In some embodiments, the one or more data contact members 112 can be positioned such that two or more data contact members 112 are nested together. The nested configuration can ensure the electrical pin 114 spacing is adequate to reduce the impedance for the specified data transfer speeds. For example, as shown in FIG. 7, four data contact members 112a-112d are nested together. The data contact members 112 can be positioned such that the first angled surface 168 of a first data contact member 112a, 112b is positioned next to or adjacent the angled edge 176 of a second data contact member 112c, 112d. As such, the angled edge 176 of the first data contact member 112a, 112b is positioned next to or adjacent the first angled surface 176 of the second data contact member 112c, 112d.

In some embodiments, the charging interface 100 is not live (e.g. turned on for power and/or data transfer) until a robot engages the charging interface 100. For example, one of the charge contact members 108 and/or one of the data contact members 112 can recognize the robot engaging the charging interface 100 when it is engaged and an electrical connection is formed. This can signal the charging interface 100 to turn on and provide power to the robot. This can act as a safety feature in warehouses, fulfillment centers, or other areas of use for the charging interface 100 and robot. For example, when the charging interface 100 is positioned in a floor or wall, this safety feature can prevent the charging interface 100 (e.g., the charge contact members 108) from receiving power when individuals walk over or come into contact with the charging interface.

Figure 8:
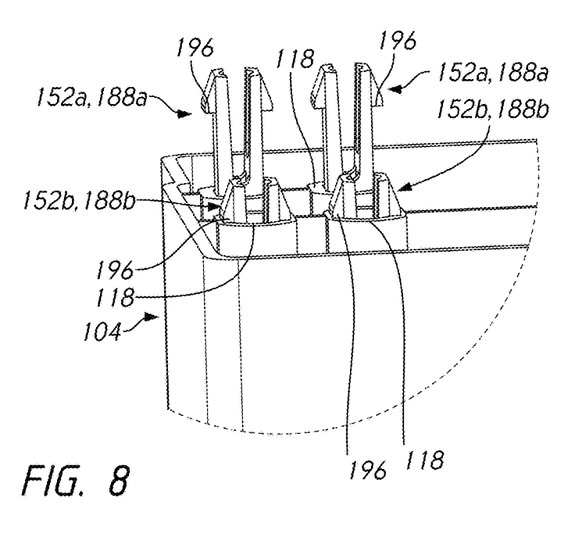
FIG. 8 is a side view of prongs of a charge contact member and/or a data contact member extending through the housing of a charging interface.

FIG. 8 is a side view of prongs 152, 188 of a charge contact member 108 and/or a data contact member 112 extending through the housing 104 of the charging interface 100. As shown, the prongs 152, 188 are extending through the openings 118. With reference to the orientation of the figures, the further back prongs 152a, 188a are positioned further away from the housing 104 and openings 118. As such, these prongs 152a, 188a represent the charging interface in an engaged state. For example, they represent a robot depressing the charge contact member 108 and/or the data contact member 112 being depressed into a recess 116 by the robot. The prongs 152b, 188b, the forward most prongs with reference to the figure's orientation, are positioned closer and/or in contact with outer edges of the openings 118. As such, the prongs 152b, 188b are depicted as in a disengaged state with the charge contact member 108 and/or the data contact member 112 biased away from the housing 104. As shown the prongs 152b, 188b, have ledges 196 configured to rest against the outer edge of the openings 118. The ledges 196 can come into contact with the outer edge of the openings 118 to retain the charge contact member 108 and/or the data contact member 112 within the housing 104.

Figure 9:
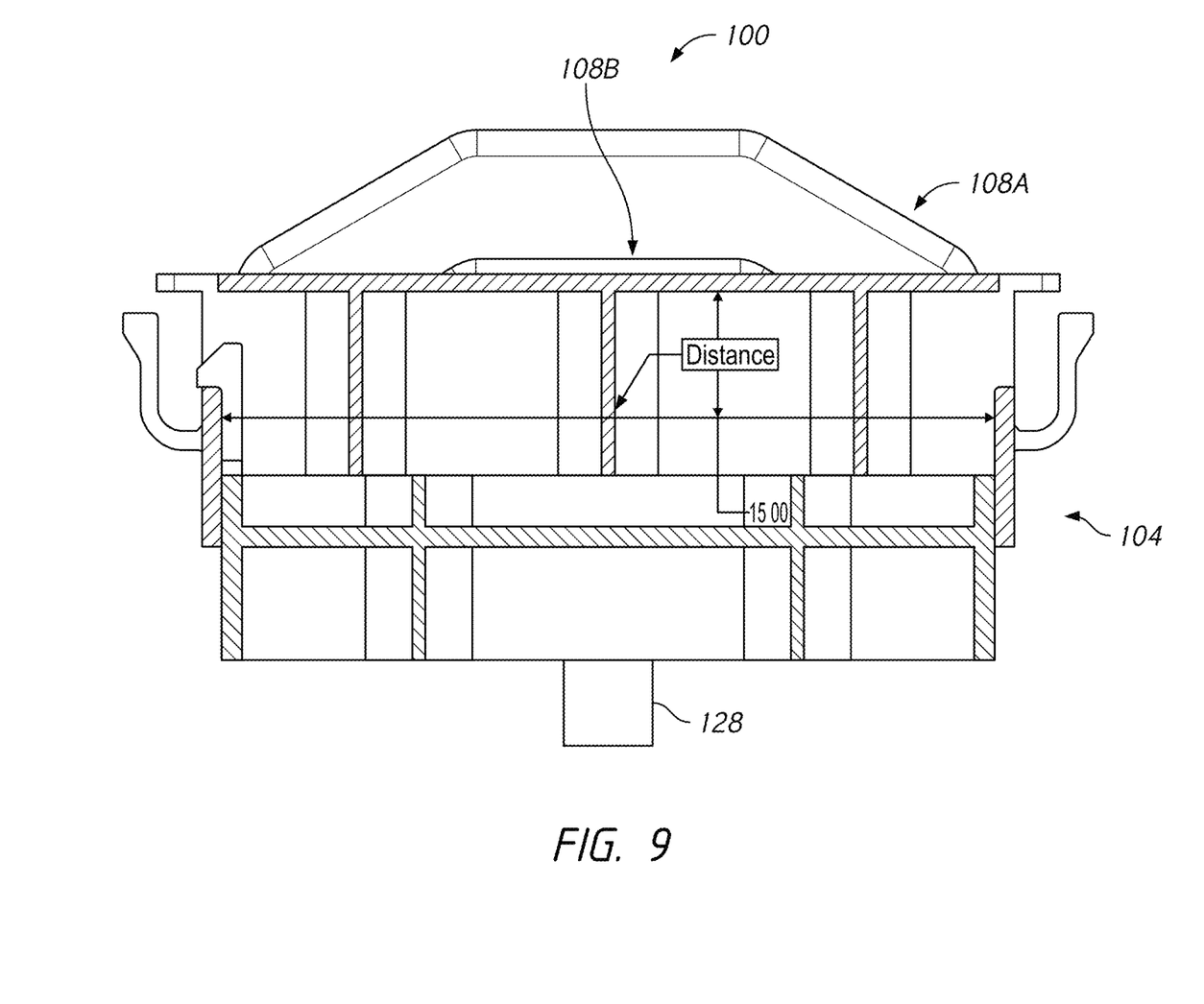
FIG. 9 is a cross-sectional view of a charge contact member in a disengaged state and a charge contact member in an engaged state.

FIG. 9 illustrates a charge contact member 108 in a disengaged state 108A and a charge contact member 108 in an engaged state 108B. While a charge contact member 108 is shown and described with reference to FIG. 9, the description can also apply to a data contact member 112. When a robot engages the charging interface 100, the robot deflects or depresses the charge contact member 108 relative to (e.g., into) the housing 104, placing the charge contact member 108 in an engaged state 108B. This can create an electrical connection between the robot and the electrical contact pin (e.g., electrical contact pin 114). The charge contact member 108 can be depressed a predetermined distance. This can push the shaft 128 further into the housing 104 and possibly a portion of the shaft 128 out of the opening 118. The predetermined distance can be substantially identical across all charge contact members 108 and/or data contact members 112 or the predetermined distance can vary. In some embodiments, the predetermined distance can be at least 5 mm, at least 10 mm, at least 15 mm, at least 20 mm or more. When the robot disengages the charging interface 100, the charge contact member 108 can return to the disengaged state 108A (e.g., due to the spring force provided by its spring or biasing member). As such the charge contact member 108 can deflect upward away from the housing 104 the predetermined distance that it depressed into the housing 104. The spring loaded or biased forces moving the charge contact members 108 (and the data contact members 112) can also clean or reduce debris or dirt on the electrical contact pins 114 of the members 108, 112. The spring force or biasing force can be varied to allow for cleaning of the electrical contact pins 114 and/or contact pins on the robot that is engaging the charging interface 100. For example, driving a robot back and forth over the charging interface 100 (i.e., engaging and disengaging the charging interface repeatedly) can assist in this cleaning of (e.g., removing dirt or other debris from) the electrical contact pins 114.

Figure 10:
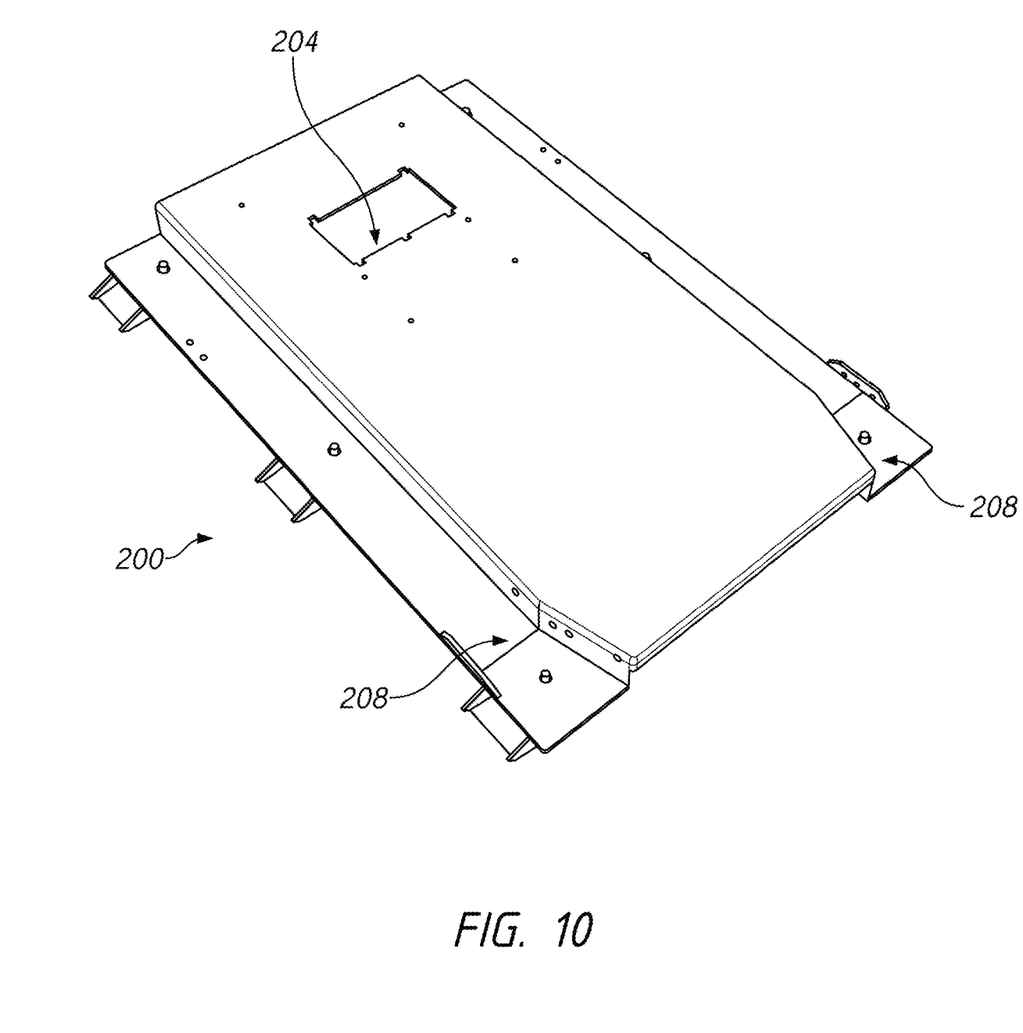

FIG. 10 illustrates a fixation member 200 that can be positioned in a surface, such as a floor, for example as shown in FIGS. 11A and 11B. The fixation member 200 can include a receiving area 204 sized and shaped to receive the charging interface 100. The fixation member 200 can include tracks 208 sized and shaped to allow a robot to drive up to the charging interface 100 and engage the charging interface 100 with an appropriate alignment. The fixation member 200 can be used to secure the charging interface 100 to the surface in which it is intended to be used.

FIG. 11A illustrates a robot 250 prior to engaging the charging interface 100 and FIG. 11B illustrates the robot 250 engaged with the charging interface 100. As shown, the robot 250 can approach the charging interface 100. In some embodiments, the charging interface 100 can be positioned in the fixation member 200. The robot 250 can engage the tracks 208 and continue moving to approach the charging interface 100. When the robot 250 reaches the charging interface 100, the robot 250 can engage the charging interface 100 such that one or more of the charge contact members 108 and one or more of the data contact members 112 are at least partially depressed into their corresponding recesses within the housing of the charging interface 100. An electrical connection can be formed between the electrical contact pins 114 of one or more charge contact member 108 and/or one or more data contact member 112 and the robot. The robot 250 can then disengage the charging interface 100 by either continue to move forward over the charging interface 100 or reversing off of the charging interface 100. This will disengage the one or more charge contact members 108 and/or the one or more data contact members 112 such that they return to a fixed position within the charging interface 100. The biasing member (e.g. 156, 192) can return the charge contact member 108 and/or the data contact member 112 to the fixed position.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. A charging interface for a robot, comprising:
   a housing comprising a plurality of recesses;
   one or more charge contact members movably coupled to the housing and configured to at least partially extend within one or more of the plurality of recesses, each charge contact member having an angled surface extending toward an upper end of the charge contact member;
   one or more data contact members movably coupled to the housing and configured to at least partially extend within one or more of the plurality of recesses, each data contact member having an angled surface extending toward an upper end of the data contact member; and
   an electrical contact pin extending through each charge contact member and each data contact member to a contact surface;
   wherein the charge contact members and the data contact members are spring-loaded relative to the housing and configured to move relative to the housing between a disengaged state where the charge contact members and the data contact members protrude above the housing and an engaged state where at least one of the charge contact members and at least one the data contact members are at least partially depressed toward the housing and within their respective recesses, the charge contact members and the data contact members being biased toward the disengaged state.

2. The charging interface of claim 1, wherein an operation of the electrical contact pins is decoupled from a movement of the data contact members and the charge contact members.

3. The charging interface of claim 1, wherein the data contact members are smaller than the charge contact members.

4. The charging interface of claim 1, wherein each charge contact member comprises a second angled surface extending from the upper end of the charge contact member.

5. The charging interface of claim 1, wherein each data contact member comprises an angled edge extending from the upper end of the data contact member, the angled edge having a width that is less than a width of the angled surface.

6. A charging interface for a robot, comprising:
   a housing comprising a plurality of recesses;
   one or more charge contact members configured to be at least partially disposed within one or more of the plurality of recesses, each charge contact member comprising an electrical charge pin extending through an opening of a surface of the charge contact member; and
   one or more data contact members configured to be at least partially disposed within one or more of the plurality of recesses, each data contact member comprising an electrical data pin extending through an opening of a surface of the data contact member; and
   wherein the charge contact members and the data contact members are movably coupled to the housing and configured to move relative to the housing between a disengaged state where the charge contact members and the data contact members protrude above the housing and an engaged state where at least one of the charge contact members and at least one the data contact members are at least partially depressed toward the housing and within their respective recesses, the charge contact members and the data contact members being biased toward the disengaged state.

7. The charging interface of claim 6, wherein an operation of the electrical charge pins is decoupled from a movement of the data contact members and an operation of the electrical data pins is decoupled from a movement of the charge contact members.

8. The charging interface of claim 6, wherein the data contact members are smaller than the charge contact members.

9. The charging interface of claim 6, wherein each charge contact member comprises a first angled surface extending toward an upper end of the charge contact member and a second angled surface extending from the upper end of the charge contact member.

10. The charging interface of claim 6, wherein each data contact member comprises an angled surface extending toward an upper end of the data contact member and an angled edge extending from the upper end of the data contact member, wherein the angled edge has a width that is less than a width of the angled surface.

11. The charging interface of claim 10, wherein the data contact members are configured to be positioned in a nested position where the angled surface of a first data contact member is positioned next to the angled edge of a second data contact member.

12. The charging interface of claim 6, wherein the charging interface can be positioned in a vertical or horizontal orientation.

13. The charging interface of claim 6, wherein one or more of the plurality of recesses comprise a through hole configured to drain pooling water.

14. The charging interface of claim 6, wherein each data contact member and each charge contact member is independently moveable and at least one data contact member has a biasing force different than a biasing force of at least one charge contact member.

15. The charging interface of claim 6, wherein each data contact member and each charge contact member comprises a shaft comprising a spring disposed about at least a portion of the shaft, the spring configured to bias each data contact member and each charge contact member toward the disengaged state, wherein a biasing force of the spring on the shaft of at least one data contact member is different than a biasing force of the spring on the shaft of at least one charge contact member.

16. A method of operating a charging interface for a robot, comprising:
receiving a force on one or both of at least one charge contact member and at least one data contact member that at least partially depresses one or both of the at least one charge contact member and the at least one data contact member toward a housing and within a recess of the housing; and
allowing one or both of power transfer via an electrical contact pin coupled to and extending through an opening of a surface of the at least one charge contact member and data transfer via a second electrical contact pin coupled to and extending through an opening of a surface of the at least one data contact member upon receiving the force.

17. The method of claim 16, further comprising moving the at least one charge contact member or data contact member to an undepressed position upon removal of the force.

18. The method of claim 16, wherein the force is applied on an angled surface of the at least one charge contact member or at least one data contact member.

19. The method of claim 16, wherein the at least one charge contact member and the at least one data contact member move independently of each other.

20. The method of claim 16, further comprising biasing the at least one charge contact member and the at least one data contact member toward an undepressed position relative to a housing.

* * * * *